April 6, 1954   W. T. HICKS ET AL   2,674,414
TRANSFERRING AND CUTTING APPARATUS
Filed Sept. 20, 1951   3 Sheets-Sheet 1
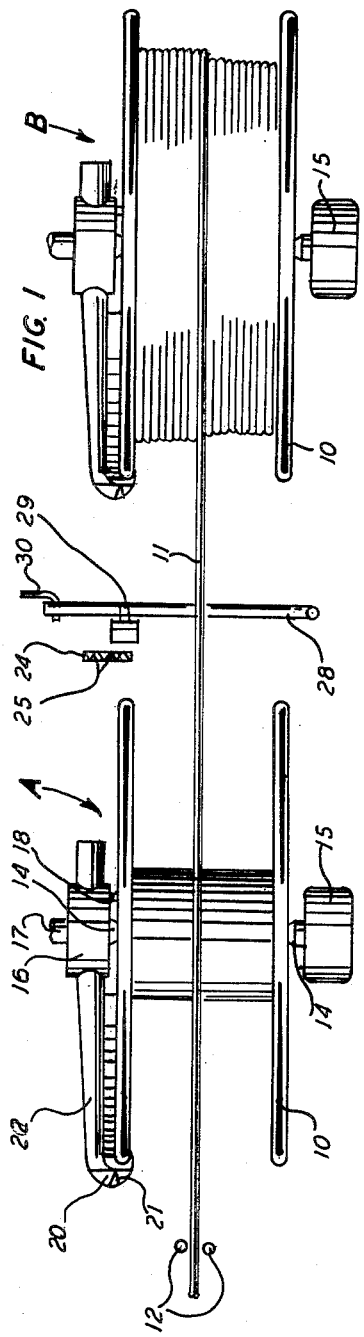
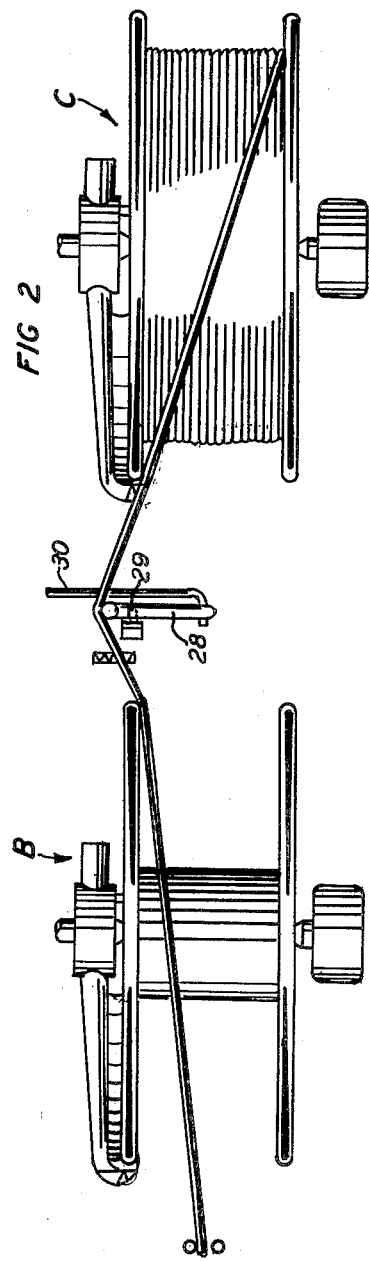
INVENTORS
W. T. HICKS
D. V. WATERS
BY
*[signature]*
ATTORNEY April 6, 1954     W. T. HICKS ET AL     2,674,414
TRANSFERRING AND CUTTING APPARATUS
Filed Sept. 20, 1951     3 Sheets-Sheet 2
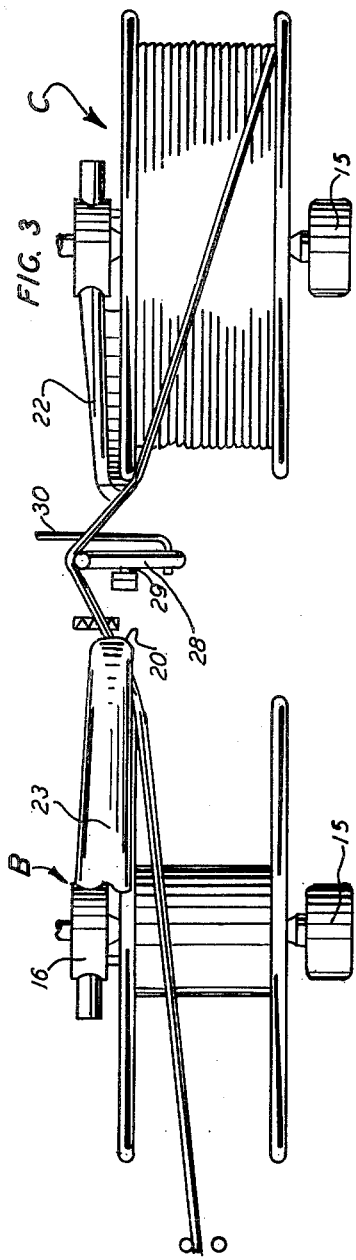
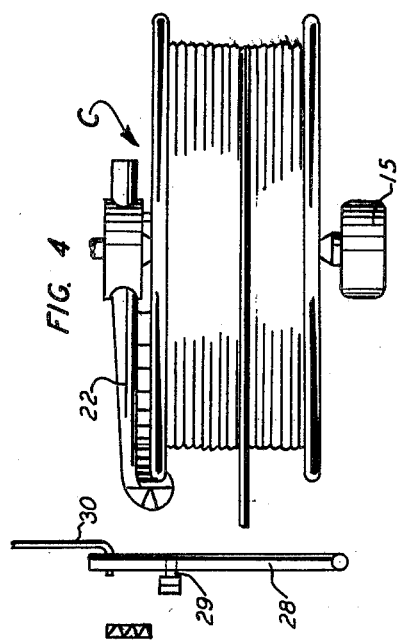
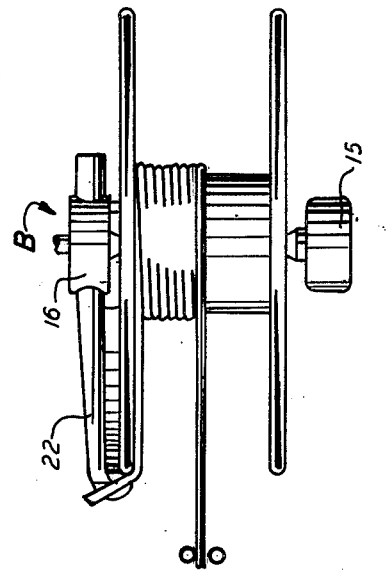
INVENTORS
W. T. HICKS
D. V. WATERS
BY
ATTORNEY April 6, 1954  W. T. HICKS ET AL  2,674,414
TRANSFERRING AND CUTTING APPARATUS
Filed Sept. 20, 1951  3 Sheets-Sheet 3
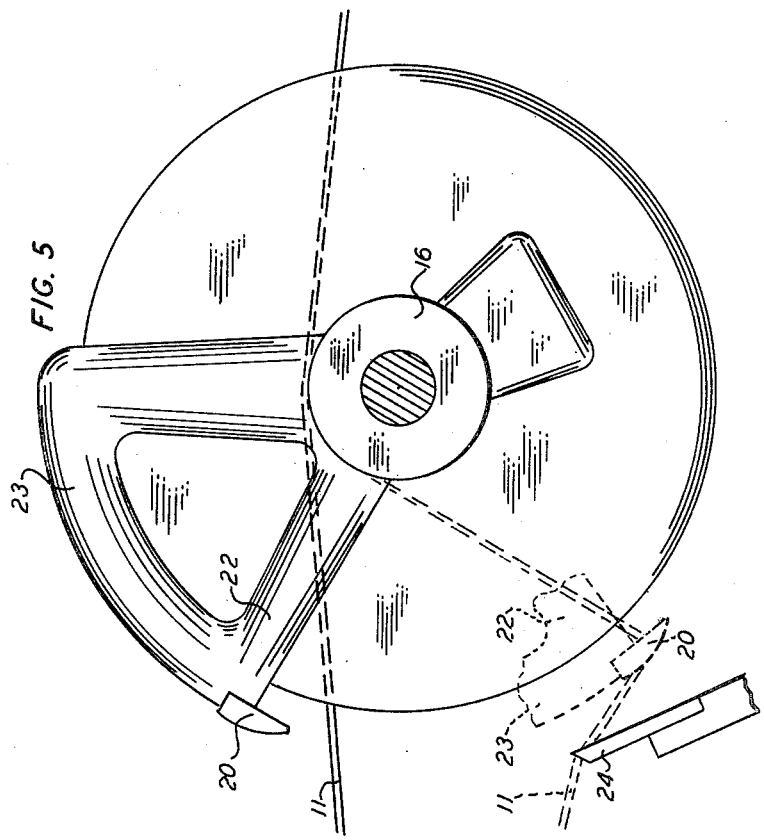
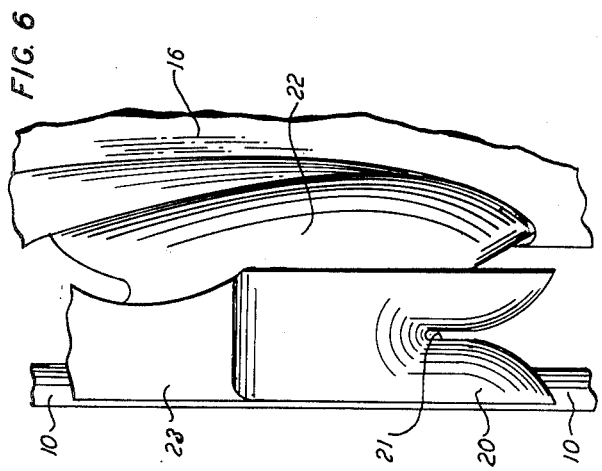
INVENTORS
W. T. HICKS
D. V. WATERS
BY W. C. Parnell
ATTORNEY Patented Apr. 6, 1954

2,674,414

UNITED STATES PATENT OFFICE 2,674,414

TRANSFERRING AND CUTTING APPARATUS

William T. Hicks, Glen Rock, and Daniel V. Waters, Lebanon, N. J., assignors to Western Electric Company, Incorporated, New York, N. Y., a corporation of New York Application September 20, 1951, Serial No. 247,524

2 Claims. (Cl. 242—25)

This invention relates to apparatus for cutting a strand in a continuous take-up mechanism and transferring the strand from a filled to an empty reel.

In the manufacture of insulated wire for the communication arts, the take-up mechanisms in most instances require stopping the machines to cut the wires, remove filled reels, insert empty reels and start the new leading ends of the wires on the empty reels. In certain instances, these steps in the method of manufacturing insulated wires have been aided considerably by a double support for reels so that an empty reel may be readily moved manually into the filling position, while the filled reel is moved into a position for subsequent removal from the machine. However, it has been necessary to stop the machine in order to cut the wire and transfer the new leading end of the wire to the empty reel. This procedure has been satisfactory with various types of insulating material wherein the stopping of the machine would not damage the material or vary its insulating qualities.

Recently it has been found desirable to extrude a plastic material on the wires to be embodied in telephone cable. This method of insulating wires for telephone cables opened the field to much higher speed operation with very little manual labor, but to practice this method to the best advantage a continuous take-up mechanism must be provided. With a continuous take-up mechanism associated with such a method, the scrapping of wire due to defective insulation or the interruption of the tubing or extrusion operation, will be eliminated. Furthermore, with automatic cutting means necessary for a continuous take-up, successive reels may be supplied with like lengths of insulated wire to be formed into a cable without the customary splices for short length and scrapping of long lengths as in the past.

An object of the present invention is to provide a mechanism in a continuous take-up apparatus which is simple in structure, yet highly efficient for cutting a strand between a filled reel and an empty reel and to wind the new leading end of the strand on to the empty reel.

With this and other objects in view, the invention comprises a mechanism which is embodied in continuous take-up apparatus capable of distributing a strand in given paths to successive driven reels moved empty into a filling position and when filled, out of the filling position, the mechanism including means to move the strand beyond the distributing paths, cut the strand and wind the new leading end thereof about the empty reel.

The means to move the strand beyond the distributing paths includes a pivotally supported arm normally positioned at one side of the distributing paths and movable transversely thereof to move the strand, regardless of its location at the time, into general alignment with a fixed cutter and an element rotatable with the empty reel to grip the strand, force it past the cutter to sever the strand and wind the new leading end of the strand about the empty reel.

Other objects will be apparent from the following detailed description when considered in conjunction with the accompanying drawings wherein:

Fig. 1 is a top plan view of the mechanism during the filling of one reel;

Fig. 2 is a top plan view of the mechanism illustrating the strand moving arm actuated;

Fig. 3 is a top plan view of the mechanism illustrating the strand about to be cut;

Fig. 4 is a top plan view of the mechanism illustrating the winding of the new leading end of the strand about the empty reel;

Fig. 5 is an end elevational view of a portion of the mechanism; and

Fig. 6 is a fragmentary front elevational view of the distributing arm.

The mechanism shown in the drawings is a part of a continuous take-up apparatus embodied in the applicants' copending application Serial No. 248,602 filed September 27, 1951. In that apparatus, an intermittently rotatable support for reels has means to receive and support empty reels as they are advanced intermittently to a filling position. Each reel supporting unit is provided with an electric motor for driving its reel. Control circuits are arranged to energize the motors prior to the movement thereof, with their reels into the filling position, continue energization of the motors in the filling position and until they have moved beyond this position.

In the drawings, reels 10 are moved into three different positions, A, B and C, as far as the present invention is concerned. The position A is back of the filling position B and the position C is beyond the filling position B. In Fig. 1 the reel 10 in the filling position B is being filled with a strand 11, which in the present embodiment of the invention, is an insulated wire. The strand 11 is distributed uniformly on the reel at position B by reciprocable elements 12 of a conventional distributor to lay the convolutions of the strand uniformly on the reel. The reel remains in the filling position B for a given length of time during which the reel is substantially filled with convolutions of the strand after which the reels are advanced one position moving the filled reel to position C as illustrated in Fig. 2 and moving the next empty reel to the filling position B.

Each reel supporting unit includes cone centers 14 supported by members 15 and 16 relatively movable to support their reels for rotation and to free the reels when filled after they move beyond the filling position. The cone center 14 of the member 16 is driven by a shaft 17 connected to a suitable power means, not shown, preferably an electric motor. The conventional pin 18 of the member 16 enters an aperture of the reel to provide a positive driving connection with the reel.

An element 20, wider than the adjacent head of the reel 10, has a narrow groove 21 of a given depth, widening at its entrance end with outwardly curved surfaces. The element is secured to a member 22 mounted on the shaft 17 for rotation therewith about the axis of the reel 10 at one side of the reel. The member 22 has an outer portion 23 extending partially around the adjacent head of the reel so that it will be out of the distributing paths of the strand 11 but will assure winding of the strand about the reel. The groove 21, formed in the element, will receive the strand when it is moved into the path thereof. The inner portion of the groove 21 is sufficiently narrow whereby the strand will be wedged therein and firmly held for winding the strand about an empty reel.

A cutter 24 having a series of V-shaped cutting edges 25 in its upper surface is mounted at a fixed position out of the distributing paths of the strand but in a position to cooperate with the element 20 in cutting the strand after the filled reel has been moved to the position C and an empty reel has been moved into the position B as shown in Fig. 2.

An arm 28 pivotally supported at 29 is normally positioned out of the distributing paths of the strand as shown in Fig. 1. An actuating means including a rod 30 connected to the lower end of the arm 28 may be actuated by an air cylinder or other suitable means to swing the arm about its pivot to move the strand 11, regardless of its distributing path, into the position shown in Fig. 2 where a portion thereof will be located above the cutter 24 and another portion positioned about the head of the reel in the path of the groove 21 of the element 20.

Considering now the operation of this mechanism, let it be assumed that the reel 10 at position B in Fig. 1 has been filled with the strand 11. When one reel is filled at the filling position B, all of the reels will be advanced one position, moving the filled reel to position C and an empty reel, formally at position A, into position B. As soon as this has been accomplished, the arm 28 will be moved about its pivot 29 through the actuation of the rod 30 causing it to transverse the distributing paths of the strand to move the strand into the position shown in Fig. 2. Here a portion of the strand is positioned above the cutter 24 and an adjacent portion extends about the head of the reel in the path of the groove 21 of the element 20.

Attention is now directed to Fig. 3 which illustrates the element 20 moving into engagement with the strand to wedge the strand in the groove 21 and through continued rotation of the element cause cutting of the strand. The new leading end of the strand will remain wedged in the groove of the element 20 and in rotating with the reel, the element will cause winding of the strand on the reel as illustrated in Fig. 4. This operation continues until the reel at the filling position is filled. The trailing end of the strand, after the cutting operation, continues to wind on the previously filled reel as illustrated in Fig. 4.

After the reel at the filled position has been rotated a given number of revolutions to fill it with the strand, the cutting and transferring operation is repeated. With this mechanism, it is possible to readily cut a strand after a reel has been filled and transfer the new leading end to an empty reel to accomplish a continuous take-up mechanism.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a continuous take-up apparatus for distributing a strand over a given area to successive driven reels moved empty intermittently in a given path into a filling position and, when substantially filled, out of the filling position, a cutter disposed out of the distributing area adjacent the filling position, means actuable subsequent to the movement of the substantially filled reel out of the filling position and the movement of any empty reel into the filling position to move the strand extending between said reels beyond the distributing area, and an element rotatable with the empty reel at the filling position to grip the strand, when moved out of the distributing area, to move it relative to the cutter to cause cutting of the strand and wind the new leading end of the strand about the empty reel at the filling position.

2. In a continuous take-up apparatus for distributing a strand over a given area to successive empty, driven reels moved intermittently in a given path into a filling position and, when substantially filled, out of the filling position, a cutter disposed out of the distributing area between the substantially filled reel out of the filling position and the next empty reel in the filling position, a member normally positioned out of the distributing area movable transversely of said area to position the strand between the empty reel at the filling position and the substantially filled reel in general alignment with the cutter, and an element rotatable with the empty reel at the filling position and adapted while the strand is so positioned by the member to move the strand against the cutter to cut the strand and wind the new leading end of the strand about the empty reel at the filling position.

References Cited in the file of this patent

UNITED STATES PATENTS

| Number | Name | Date |
| --- | --- | --- |
| 1,393,286 | Hosford | Oct. 11, 1921 |
| 1,637,700 | Lee et al. | Aug. 2, 1927 |
| 1,672,984 | Marchev | June 12, 1928 |
| 1,988,437 | Brillhart et al. | Jan. 22, 1935 |
| 2,361,813 | Beckman | Oct. 31, 1944 |
| 2,424,021 | Cook | July 15, 1947 |